United States Patent

[11] 3,580,653

| [72] | Inventor | Carroll E. Thomas<br>San Francisco, Calif. |
|---|---|---|
| [21] | Appl. No. | 776,726 |
| [22] | Filed | Nov. 18, 1968 |
| [45] | Patented | May 25, 1971 |

[54] ARTIST'S PAINTING KIT AND TRIPOD ADAPTER THEREFOR
8 Claims, 10 Drawing Figs.

| [52] | U.S. Cl. | 312/231, 248/454 |
|---|---|---|
| [51] | Int. Cl. | A47b 97/04, A47b 27/00 |
| [50] | Field of Search | 312/231, 244, 250; 248/168, 451—461 |

[56] References Cited
UNITED STATES PATENTS

| 2,919,093 | 12/1959 | Mooney | 248/168 |
|---|---|---|---|
| 3,031,247 | 4/1962 | Schieve | 312/231 |
| 3,389,945 | 6/1968 | Thomas | 312/231 |
| 3,414,343 | 12/1968 | Thomas | 312/231 |

*Primary Examiner*—Casmir A. Nunberg
*Attorney*—Arlington C. White

ABSTRACT: The invention comprises, in combination with a camera tripod and a portable kit as described and claimed in my copending application, U.S. Ser. No. 609,536, filed Jan. 16, 1967, and entitled ARTIST'S PAINTING KIT now Pat. No. 3,414,343, for removably carrying artist's equipment and provided with a hinged lid for supporting an easel in predetermined inclined position with respect to a base plate, an adapter disposed in underlying relation to the bottom of said kit and bottom of said baseplate for removably mounting said kit and said artist's equipment upon the top plate of said camera tripod, and means extending through said easel and bearing upon said adapter for removably holding said kit and said artist's equipment including said easel against displacement.

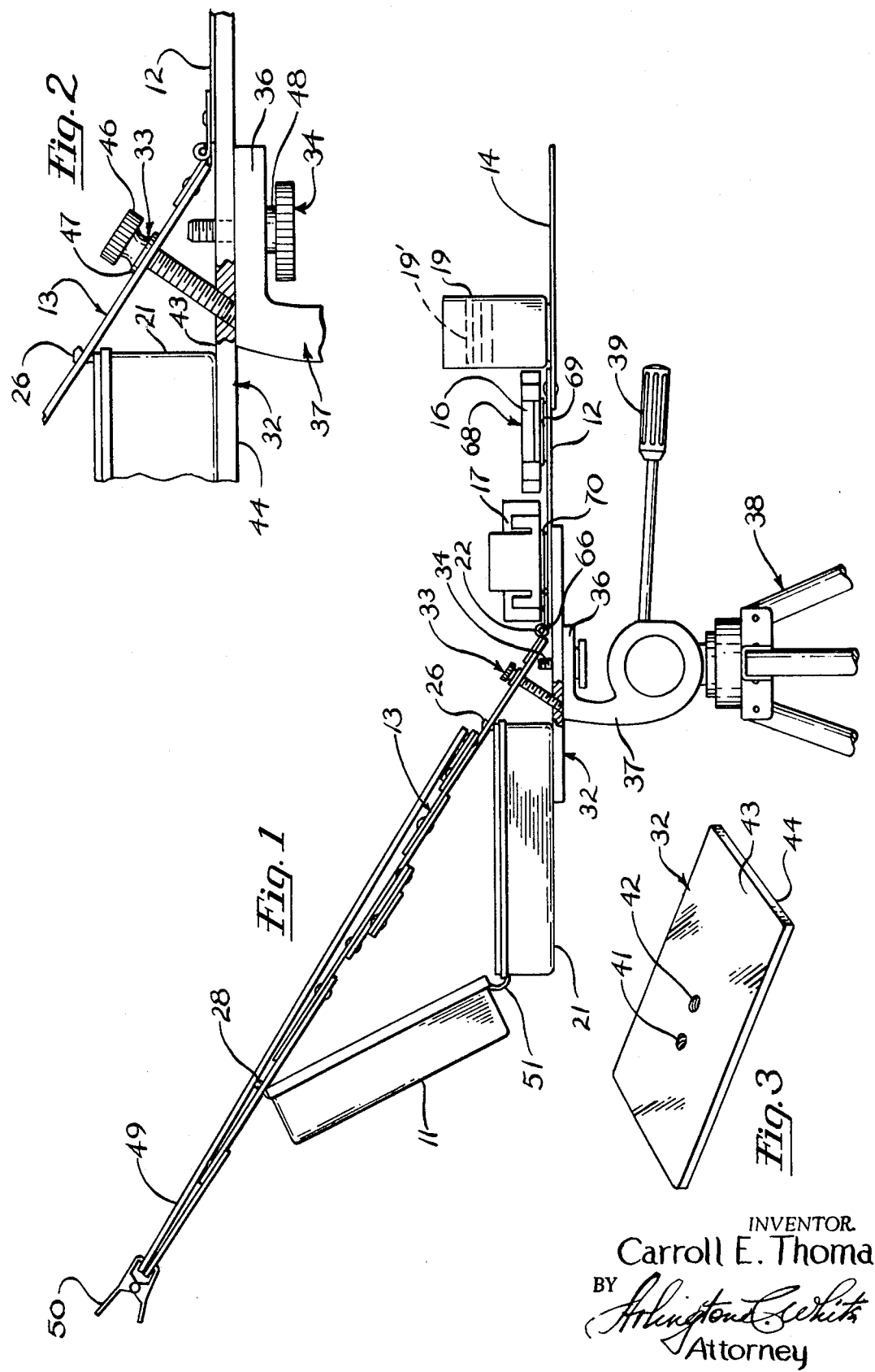

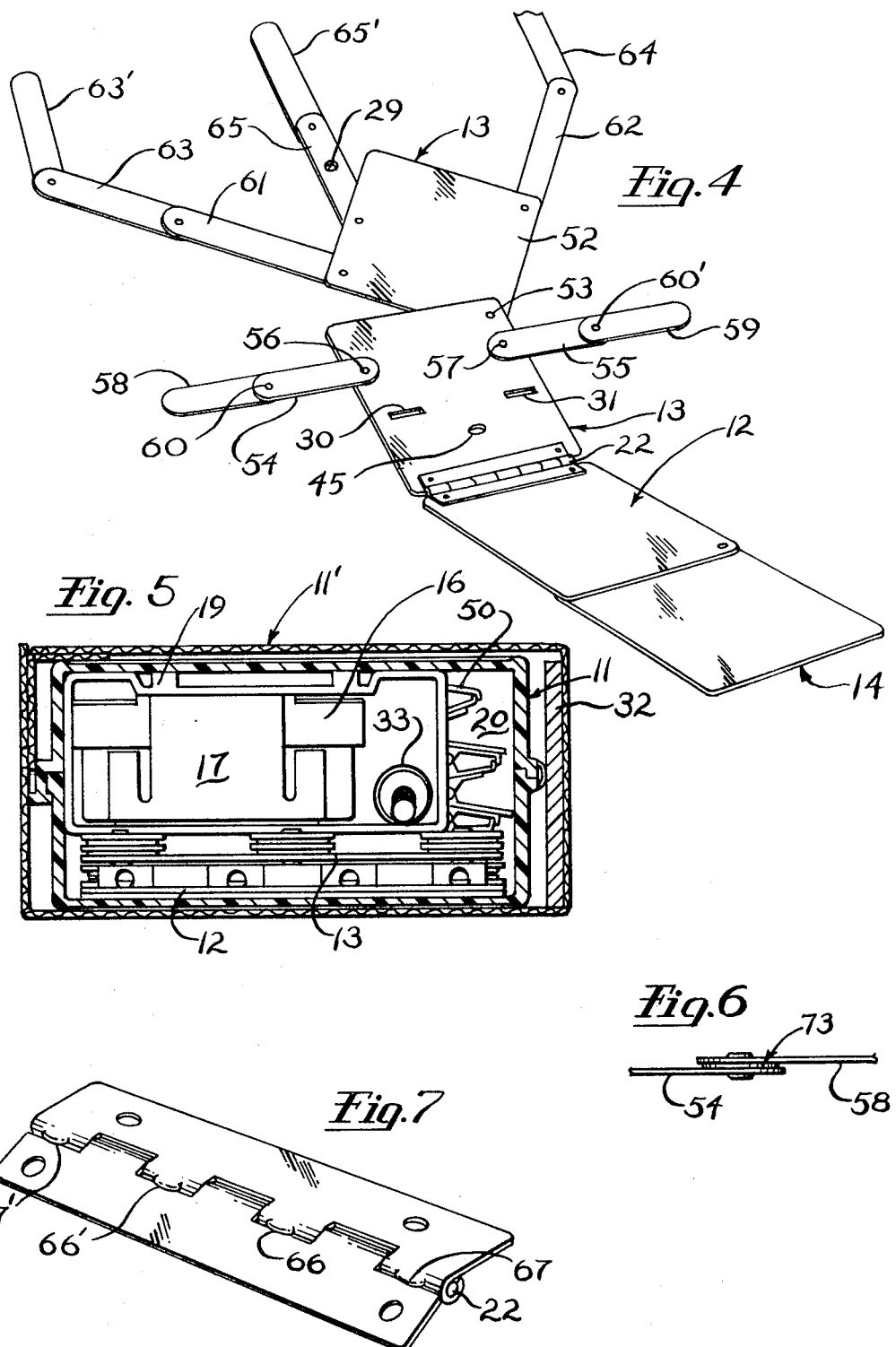

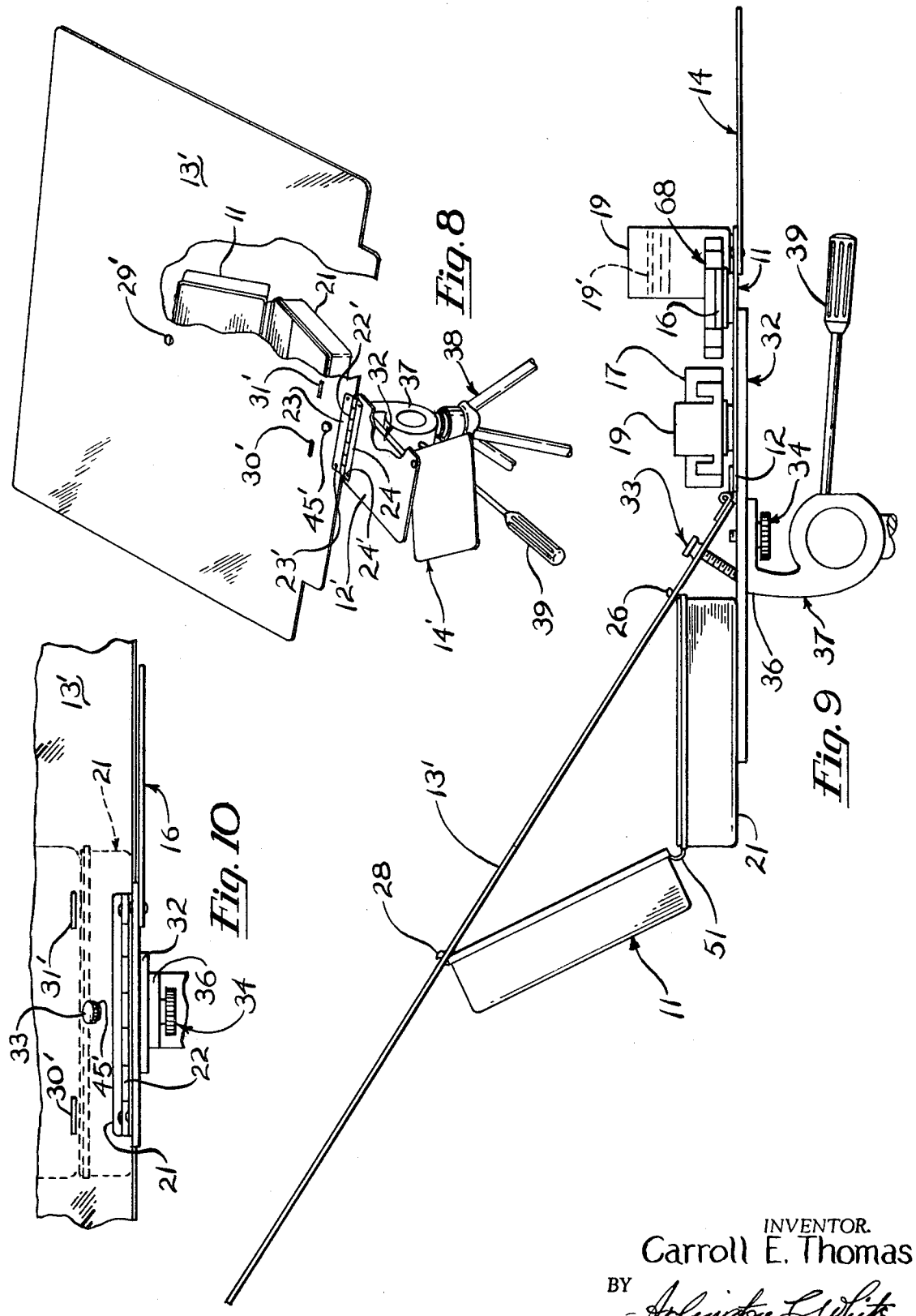

ARTIST'S PAINTING KIT AND TRIPOD ADAPTER THEREFOR

The invention, in general relates to artist's painting equipment. More particularly, the invention pertains to means for supporting such equipment either in the palm of the hand or on one's lap but also and primarily for supporting such equipment on a conventional camera tripod so that an artist will have both hands free for painting.

It is perhaps well known that most artists usually carry or take along with them a camera tripod as incident to the normal equipment for painting inasmuch as an artist will normally photograph a scene or object with a camera mounted on the tripod to assist him in composing a picture which he will paint upon any selected one of a plurality of various artist's painting grounds supported on an easel. The present invention is directed to the combination of a camera tripod with a portable kit of the aforementioned character and with artist's equipment set up for making a painting.

A primary object of the present invention is to provide an artist's painting kit and tripod adapter which is readily and easily assembled and set up in rigid equilibrium in a minimum of time for use by an artist.

Another important object of my present invention is to provide a combination of the indicated nature which is additionally characterized by the utilization of the tripod adapter as a protector against damage to the hinge of the portable case when not in use with the camera tripod.

A still further object of the invention is to provide a combination of an artist's painting kit and tripod adapter of the aforementioned character which enables the use of an enlarged easel for holding artist's painting grounds.

Other objects of the invention, together with some of the advantageous features thereof, will appear from the following description of a preferred embodiment of the invention which is illustrated in the accompanying drawings. It is to be understood, however, that I am not to be limited to the precise embodiment illustrated, nor to the precise components, thereof as shown, as my invention, as defined by the appended claims, can be embodied in a plurality and variety of forms.

Referring to the drawings:

FIG. 1 is a side elevational view of a preferred embodiment of the invention; this view showing a camera tripod component in fragmentary elevation.

FIG. 2 is an enlarged detail of certain components of the preferred embodiment of the invention; this view illustrating the removable mounting of artist's equipment on a tripod.

FIG. 3 is a perspective view of the preferred adapter component employed in the preferred embodiment of the invention.

FIG. 4 is a view of certain components of the invention illustrating the extensible easel for receiving various sizes of artist's paper, canvas board, masonite or like painting grounds.

FIG. 5 is a sectional end elevational view showing the portable kit component within a carrying carton; this view illustrating the position of the adapter within the carton to protect the hinge of the kit against damage in transit.

FIG. 6 is a detail illustrating the pivotal mounting of easel extensions and linkage thereof.

FIG. 7 is a rear perspective view of the hinge element connecting the easel plate and the base plate; this view illustrating the stops for limiting the rearward inclination of the easel.

FIG. 8 is a front perspective view of the portable kit component supporting an enlarged nonfoldable easel and hingedly connected base plate with palette, all mounted on a camera tripod.

FIG. 9 is a side elevational view of the combination of FIG. 8.

FIG. 10 is an enlarged detail of the components illustrated in FIGS. 8 and 9.

This application is a continuation-in-part of my copending application hereinabove mentioned.

In its preferred form, the artist's painting kit and tripod adapter therefore of the present invention preferably comprises, in combination with a tripod and a portable kit for removably holding artist's equipment including an easel plate hingedly connected to a base plate, a tripod adapter removably seated upon the flat horizontally disposed top plate of said tripod in underlying relationship to said portable kit and said baseplate, and means bearing upon and extending through said easel plate as well as engaging said tripod adapter for removably supporting said easel plate and said portable kit as well as said baseplate with components of artist's equipment thereon in stable equilibrium and against displacement.

As particularly illustrated in FIGS. 1 and 2 of the annexed drawings, I provide a portable kit 11 which preferably is made from a lightweight plastic material, such as polypropylene or other suitable materials. The kit 11 serves to hold in compact arrangement most of the paraphernalia or components of an artist's equipment, with the exception of long brushes, for the painting of any object or scene, some of which components being shown within the case as illustrated in FIG. 5 of the annexed drawings. These components include a steel baseplate 12 preferable having a porcelain coating thereon, an extendable yet foldable easel 13 hingedly connected to an end of the base plate 12 so that when folded the easel may be positioned in overlying relation to the baseplate, a main palette 14 swingable on the baseplate to an open position for use, as well as to a closed position underlying the baseplate, and also include a paint box 17 with its removable lid 16, as well as a water container 19, two palette cups not shown in this view, a number of clamps for detachably fastening artist's grounds to the easel, and an adapter screw hereinafter described, all housed within a single compartment 20 of the case 11. The closed portable kit 11 with its held artist's equipment is removably disposable for convenient carrying about or shipping within carrying carton 11' with the adapter plate component disposed on the edge between the back of the kit 11 and an inner wall of the carton 11' to protect the hinge of the portable case against damage. It may be noted here that the various components of artist's equipment removably disposed in the portable kit are fully described and claimed in my aforementioned copending application.

While not comprising parts, per se, of the present invention, it is to be observed that the portable kit 11 is provided with a swingable cover 21 which is hingedly connected to the body of the kit by means of a flexible hinge member as shown particularly in FIG. 9 of the accompanying drawings, and the kit is also provided with suitable complementary latch members, not shown, on the cover and body of the kit, respectively, for normally holding the cover in a closed position on the body of the kit. I also provide a pair of lugs 26, of which but one is shown in FIGS. 1 and 2, on the cover 21 of the kit 11, as well as a lug 28 on the body portion of the kit; the lug 28 projecting from the upper edge of a side of the body of the kit for passing through an opening 29 formed in a link extension of easel 13, see FIG. 4, and the pair of lugs 26 which project in spaced relationship from an upper edge of the cover 21 of the kit, passing through openings 30 and 31 of the easel thereby affording a three point support for the easel on the kit when the cover 21 of the kit seats on a flat horizontal surface and when the body of the kit is swung rearwardly to an inclination from the vertical, thus supporting the easel in a suitable inclined position ready for an artist's use.

In FIGS. 1 and 2, I have illustrated the extensible easel 13 supported on the portable kit 11 with the extension members thereof in folded positions underlying the main plate of the easel; such easel 13 being shown in fully extended form in FIG. 4 of the drawings. The extensible easel 13, per se, is no part of the present invention since it is fully described and claimed in my aforementioned copending application. It may be observed here, however, that a reduced size of easel 13 as shown in FIG. 4 for use by amateurs may be provided by eliminating the outer links of the extension members. In FIGS. 8 and 9, I have shown an enlarged nonfoldable rigid or inflexible easel 13' in an inclined position on the portable kit 11; said enlarged easel 13' clearly indicating that the combination of my present invention can be readily employed for painting larger views or objects with the larger easel 13' supported upon a tripod in the same manner as the smaller easel 13.

In accordance with the present invention, I provide means for removably supporting all of an artist's equipment upon a conventional tripod, such as a camera tripod after removing the camera, which is illustrated in fragmentary view in FIGS. 1, 2 and 9 in the accompanying drawings, and in like view in FIG. 8 thereof. These means preferably comprise a flat adapter plate 32, together with specially fabricated or formed thumbscrews 33 and 34 for removably mounting the aforesaid artist's equipment upon the top flat section 36 of the head 37 of a tripod 38 which may be, as stated, a conventional camera tripod, incorporating a handle 39 for readily turning the head 37 at will. The adapter plate 32 is fashioned with a pair of through openings 41 and 42 therein, both of which are threaded; the threaded opening 41 being inclined with respect to the top 43 and bottom 44 of the adapter plate, while the other threaded through opening 42 is normal thereto for threadedly receiving the relatively long thumbscrew 33 and the relatively short thumbscrew 34, respectively. It may be observed here that the thumbscrew 34 is a standard component of most all camera tripods for removably fastening a camera to the flat surface 36 of the head thereof.

As shown particularly in FIG. 2 of the accompanying drawings, the relatively long thumbscrew is provided with an enlarged head 46 which is knurled on its side for convenience of turning thereof, as well as is provided with annular flange 47 which seats on the upper surface of the inclined easel 13, or 13' as the case may be, when the thumbscrew is passed through an opening 45 formed in both of these easels and threaded or turned down to its fullest extent into the inclined threaded through opening 41 of the adapter plate 32 thus securely fastening the easel to the adapter in such inclined position. The relatively short thumbscrew 34 extends through the flat top section 36 of the tripod head 37 and is threaded through the straight threaded through opening 42 of the adapter 32 with its flange 48 bearing upon the underside of the tripod head to firmly secure the adapter to the tripod 38. Thus, the adapter can securely hold the easel and portable kit supporting the same in an inclined position as well as firmly hold the baseplate, main palette and components of the artist's equipment in stable and balanced equilibrium upon the tripod 38, all as illustrated in FIG. 1 of the annexed drawings. With water 19' in the container 19, the water serves as a level for the artist to determine the horizontal position of the baseplate 12. Suitable clamps 50, see FIG. 1 will serve to hold the painting ground on the easel 13 or 13'.

Upon finishing a day's work, the artist can readily take down the easel 13 and fold under its main plate the various extension elements as well as the auxiliary plate 52 on the pivots thereof into a size equal to the size of the main easel plate. Thereafter, the main easel plate with its underlying folded extensions and auxiliary plate can be folded on the hinge 22 and swung to a position overlying the baseplate 12 and placed on the bottom of the compartment 20 of the portable kit 11 after first swinging the main palette 14 on its pivot to a position underlying the baseplate. The water container 19 is then unhooked from a side of the paint box 17 and the lid of the paint box replaced on the top of the box and the latter is then partially inserted into the water container laid on its side. The two components of paint box and water container are then disposed into the kit 11 on top of the easel baseplate and palette. The palette cups, not shown in the drawings are then placed in compartment 20 of the kit alongside the paint box, and the collected clamps 50 as well as the long thumbscrew 33 are then diaposed in the remaining space of the compartment. The cover 21 of the kit can then be closed in latched position and the case then disposed in carrying carton 11' but before closing the carton the adapter 32 is placed on an edge between the kit hinge 51 and an inner wall of the carton to protect the hinge against damage, see FIG. 5.

The easel 13 herein illustrated is no part, per se, of the present invention inasmuch as it has been previously described as a component of the invention claimed in my aforementioned copending application. As shown in FIG. 4 of the accompanying drawings easel 13 includes in addition to its main plate having the openings 30, 31 and 45 therein, an auxiliary plate 52 swingably connected by means of a rivet 53 to the main plate to provide a full body extension of the main easel plate. Moreover, I provide on the main easel plate a pair of horizontally projectable extension elements 54 and 55 which are swingable on the main plate of the easel by means of rivets 56 and 57 and which, in turn, carry foldable extensions 58 and 59, respectively, connected thereto by rivets 60 and 60' Similarly, the auxiliary easel plate 52 is provided with pivotally connected foldable extensions 61 and 62 carrying, respectively, pivotally connected further extensions 63, 63' and 64. Additional link extensions 65 and 65' are carried on the auxiliary plate 52 between the extensions 61 and 62 as shown. It is to be understood that for amateur painters' kits some of the extensions 58–59–61 etc. may be omitted. Or, if desired, the main easel plate can be only slightly enlarged by using the auxiliary plate 52 with the main plate and, should it be desired, unfolding one or more of the link extensions just described. In FIG. 6, I have shown a detail illustrating the manner of connecting together the link extensions, such as the extension 54 and added link extension 58 joined together by rivet 60. In order to cushion the rivets, eliminate lubrication as well as to afford correct tension for all moving parts, Teflon washers 73 are employed between each rivet and the easel plates as well as between the several links of each extension element.

In accordance with the present invention, I provide the nonfoldable easel plate 13' to enable an artist to paint large scenes and objects whenever desired; such easel 13' comprising a single flat plate preferably having dimensions of approximately 15 inches by 22 inches and which must, of course, be carried separately from the portable kit 11 and carrying carton 11'. The easel plate 13' carries on one end thereof at its approximate transverse center a hinge 22' with one of its hinge plates 23 riveted to the to the easel plate, as at 23', and with its other hinge plate 24 riveted as at 24' to a base plate 12' which swingably carries by means of a suitable pivot a main palette 14', all as shown in FIGS. 8 and 9 of the accompanying drawings. The easel 13' also is formed with a pair of transversely aligned openings 30 ' and 31' therein for receiving the lugs 26 on the cover 21 of the portable kit 11, as well as with an opening 45' therein for passing the relatively long thumbscrew 33 whereby the large easel 13' may not only be supported in a suitably inclined position on the portable kit 11 in the same manner as the easel 13 is supported, but it also may be supported and securely fastened in such inclined position to the adapter 32 for removably mounting the larger easel 13' on the tripod 38 as in the case of the smaller easel 13.

To limit the rearward inclination of the easel 13, and of the easel 13' when employed, the hinges 22 and 22' between the easel plates and the base plates are provided with protuberances or stops. As shown particularly in FIG. 7 of the drawings, the hinge plate on baseplate 12 is fashioned with four stops, designated by the reference numerals 66, 66', 67 and 67' which project outwardly into the path of the easel plate 13 as it is inclined backwardly on the hinge 22 from the underside of the hinge plate on the baseplate 12. While not shown in the drawings, the hinge plate 24 on baseplate 12', constituting a part of the hinge 22' connecting the baseplate 12' with the easel 13', is similarly provided with stops to limit the rearward inclination of the easel 13'.

I may also add here that the upper surfaces of the baseplates 12 and 12', which are made from ferrous metal, as well as the main pallette 14 and main palette 14' which also are made of ferrous metal, are coated with porcelain or other suitable material, so that these surfaces may be used for the mixing of paints. It also may be observed that the outer surface of the lid 68 of the paint box 17 is provided with a suitable magnet 69, and I also secure a magnet 70 to the bottom of the paint box 17 for cooperating with the underlying baseplates 12 and 12' to firmly hold the paint box 17 and the inverted lid 68 in equilibrium on the baseplates when in use; the inverted lid 68 serving as an auxiliary palette reservoir, all as described and claimed in my aforementioned copending application, magnets being secured also on the bottoms of all cups.

I claim:

1. An artist's painting kit and tripod adapter therefore comprising, in combination with a baseplate for supporting components of an artist's equipment in position for use and a flat top on a tripod, an open (case) kit consisting of a cover and a body section hingedly connected to said cover and disposed at an inclination thereto; said (case) kit normally holding the components of an artist's equipment, an easel removably mounted on said cover and said body section of said (case) kit in an inclined position, an adapter plate partially underlying said cover of said open (case) kit and partially underlying said baseplate, a removable element connecting said easel to said adapter plate, and means removably mounting said adapter plate on said flat top of said tripod for holding said inclined easel and said components of artist's equipment on said baseplate in stable equilibrium upon said flat top of said tripod.

2. An artist's painting kit and tripod adapter therefore as defined in claim 1, wherein said adapter plate has an inclined threaded opening therethrough and a straight threaded opening therethrough extending normal to the top and bottom thereof, and wherein said removable element comprises a thumbscrew extending through said inclined easel and into said inclined threaded opening of said adapter plate, and wherein said means comprises a screw extending through said flat top of said tripod and into said straight threaded opening of said adapter plate.

3. An artist's painting kit and tripod adapter therefore as defined in claim 2, and a flange on said thumbscrew bearing upon the upper surface of said easel when said thumbscrew is turned down into said inclined threaded opening of said adapter plate to its fullest extent, and a flange on said screw bearing against the underside of said flat top of said tripod when said screw is turned up into said straight opening of said adapter plate to its fullest extent.

4. An artist's painting kit as defined in claim 1 wherein said easel is foldable upon itself and foldable upon said baseplate to overlie the same.

5. An artist's painting kit as defined in claim 1 wherein said easel is flat and inflexible and wherein said baseplate is hingedly connected to an end of said inflexible easel and foldable against the same.

6. An artist's painting kit as defined in claim 1, and a palette pivotally connected to said baseplate, said palette pivotally connected to said baseplate, said palette being adapted to be pivoted to a closed position underlying said baseplate, and wherein said easel is rigid and of greater dimension than said baseplate and said palette, and a hinge connection between said baseplate and said rigid easel whereby said baseplate and connected palette may be folded against said rigid easel.

7. In combination with a flat top tripod including a threaded stud projecting from said flat top and artist's painting equipment including a flat baseplate having a hole therethrough and an easel supported on and at an incline to said baseplate, and adapter plate for removably supporting said artist's painting equipment on said tripod; said adapter plate comprising a flat strip having a straight threaded opening therethrough and having an inclined threaded opening therethrough in spaced relation to said straight threaded opening; said flat strip being adapted to be screwed down on said threaded stud of said tripod to seat on said flat top thereof with said stud passing through said hole of said baseplate, and a thumbscrew extending through said easel and threadedly engaging the threads of said inclined threaded opening of said flat strip to hold said easel and baseplate in stable equilibrium on said tripod.

8. In the combination set forth in claim 7, and a flange on said thumbscrew, said flange being adapted to bear upon the upper surface of said easel when said thumbscrew is extended to its fullest extent in said inclined threaded opening of said flat strip.